United States Patent

[11] 3,575,052

| [72] | Inventor | Paul E. Lenker |
| | | Davenport, Iowa |
| [21] | Appl. No | 807,699 |
| [22] | Filed | Mar. 17, 1969 |
| [45] | Patented | Apr. 13, 1971 |
| [73] | Assignee | The Bendix Corporation |

[54] MASS FLOWMETER
12 Claims, 8 Drawing Figs.

[52] U.S. Cl. .................................................. 73/231, 73/194(M)
[51] Int. Cl. .................................................. G01f 1/12
[50] Field of Search .......................................... 73/231 (M), 231, 194 (M), 229, 230

[56] References Cited
UNITED STATES PATENTS

| 3,144,769 | 8/1964 | Francisco | 73/231(M) |
| 3,306,105 | 2/1967 | Ichihara et al. | 73/231(M) |
| 3,308,662 | 3/1967 | Maurer | 73/231(M) |

*Primary Examiner*—James J. Gill
*Assistant Examiner*—Marvin Smollar
*Attorneys*—William N. Antonis and Plante, Arens, Hartz, Hix and Smith ABSTRACT: A fluid flowmeter capable of providing a true-mass flow rate readout in which a fluid powered drive turbine and a reaction turbine are arranged in the flowing fluid so that the reaction turbine is driven by the drive turbine in a manner such that the reaction turbine lags the drive turbine by a lag angle which is proportional in magnitude to the mass flow rate of the stream. A variable bypass opening is provided in the drive turbine which is closed at zero flow rate and is automatically progressively opened as the lag angle is increased to thereby enable accurate operation of the flowmeter over a significant flow range. An optical device is provided for continuously reading out the lag angle, by providing a time measurement, to provide a continuously recurring indication of flow rate.

Patented April 13, 1971 3,575,052
3 Sheets-Sheet 1
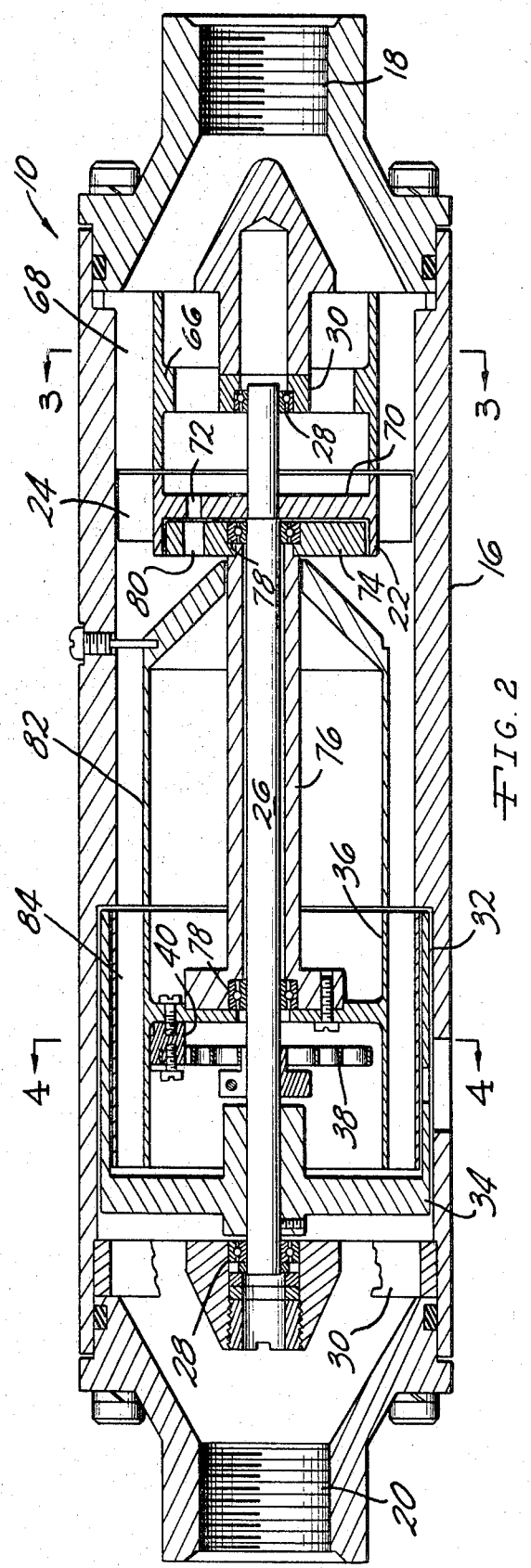
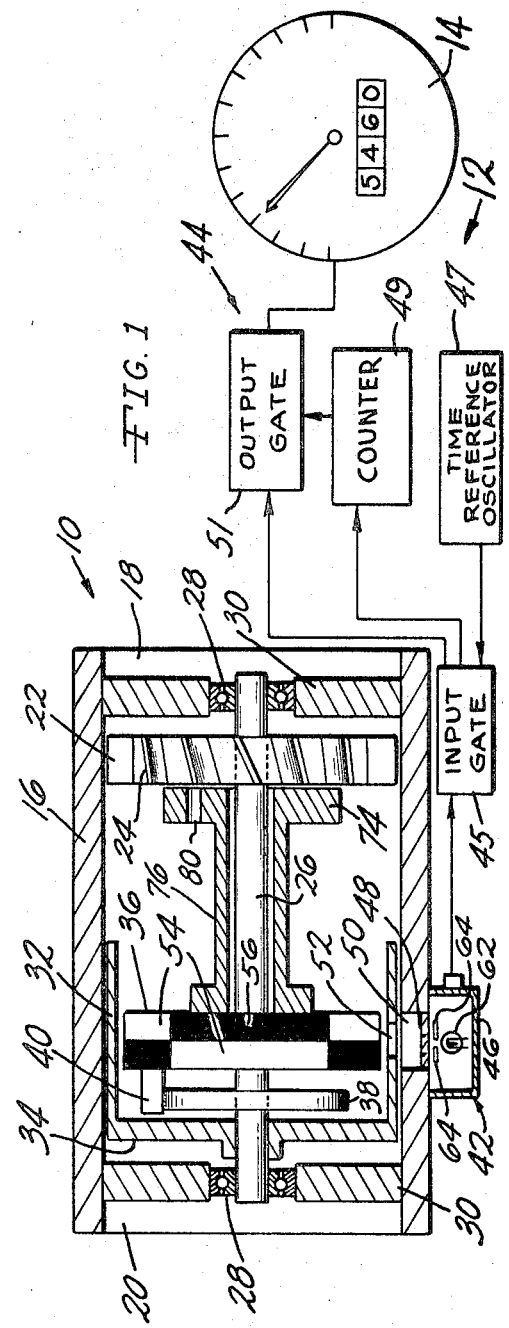
INVENTOR
PAUL E. LENKER
BY *William N. Antonis*
ATTORNEY

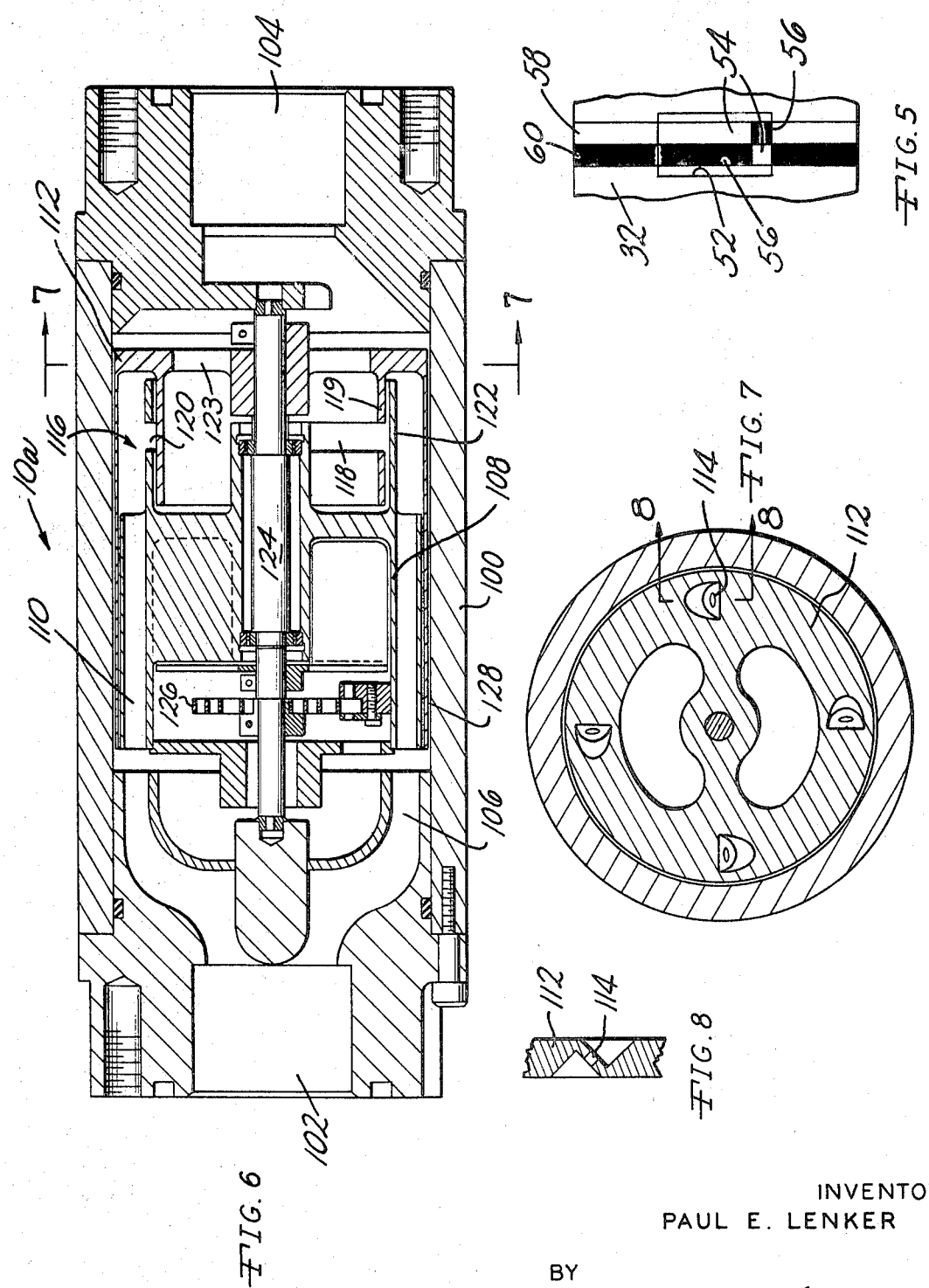

MASS FLOWMETER

BACKGROUND OF THE INVENTION

In most previous angular momentum flow systems, accurate flow rate measurements have depended upon operation of a drive turbine at a constant speed to eliminate the speed variable in the measurement. It has been found that it is difficult in such a system to maintain constant speed over a significant flow range. Such devices are therefore impracticable to design from the standpoint of mechanical difficulties and high pressure drop.

SUMMARY OF THE INVENTION

In the mass flowmeter of this invention, the basis of the flow measurement is the torque required to change the angular velocity of the fuel flowing through the flowmeter casing. This torque requirement is determined by a reaction turbine which is driven, through a spiral spring coupling, by a drive turbine. The drive turbine is driven by the fluid flowing through the casing so that the reaction turbine always lags the drive turbine by some angle which is a function of the flow rate. A time base readout is provided for measuring the time required for fixed reference points on the drive and reaction turbines to pass a fixed point on the casing. This time remains constant for any constant flow rate even if the speed of the drive turbine should vary. In the illustrated embodiment of the invention, an optical system is provided which cooperates with a shroud attached to the drive turbine and light reflecting surfaces on the shroud and the reaction turbine to provide the desired time measurements.

Bypass openings are provided in the drive turbine, and a valve member attached to the reaction turbine operates to progressively uncover these openings as the lag angle is increased in response to increased flow to thereby enable operation of the flowmeter over substantial flow ranges.

Further objects, features and advantages of this invention will become apparent from a consideration of the following description, the appended claims, and the accompanying drawing in which:

FIG. 1 is a somewhat diagrammatic illustration of a fluid flow indicator system which includes the flowmeter of this invention;

FIG. 2 is a longitudinal sectional view of one form of the flowmeter of this invention with the optical unit removed;

Figure 3:
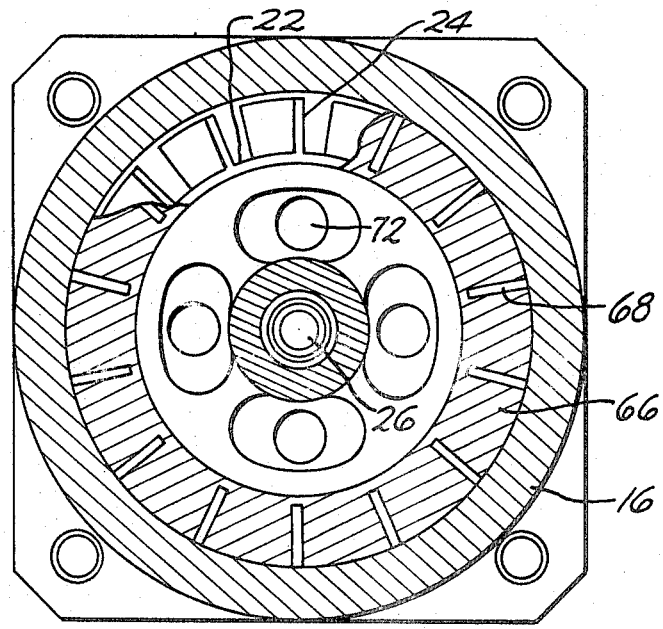
Figure 4:
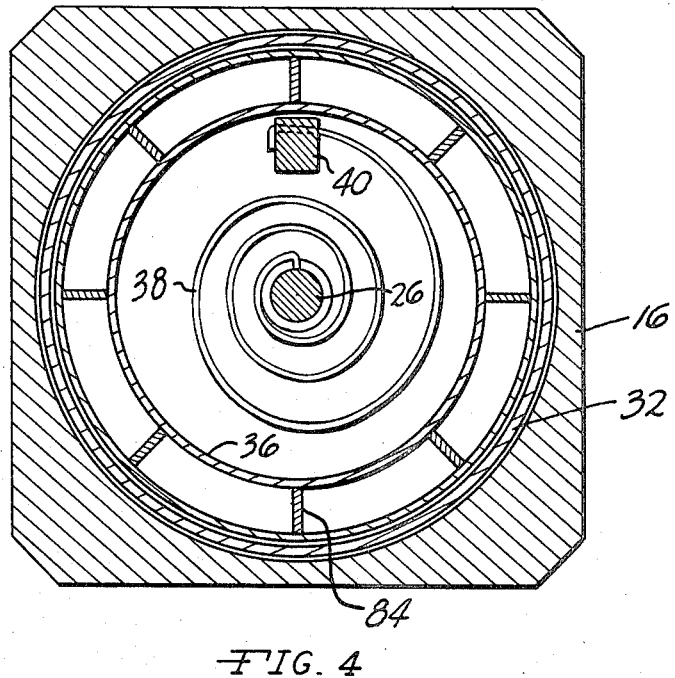

FIGS. 3 and 4 are enlarged transverse sectional views of the form of the flowmeter of this invention shown in FIG. 2 as seen from substantially the lines 3-3 and 4-4, respectively, in FIG. 2;

FIG. 5 is a fragmentary plan view of a portion of the flowmeter utilized in providing continuous time measurements indicative of flow rate;

FIG. 6 is a longitudinal sectional view of another form of the flowmeter of this invention with the optical unit removed;

FIG. 7 is a transverse sectional view of the form of the flowmeter shown in FIG. 6 as seen from the line 6-6 in FIG. 6; and FIG. 8 is a fragmentary detail sectional view of the drive turbine as seen from substantially the line 8-8 in FIG. 7.

With reference to the drawing, one form of the flowmeter of this invention, indicated generally at 10, is shown in FIG. 1 in a fuel flow indicating system 12 which includes a fuel flow rate gauge 14. The flowmeter 10 includes a generally tubular casing 16 having an inlet end 18 and an outlet end 20. A drive turbine 22 having a peripheral vanes 24 is attached to a shaft 26 rotatably supported in bearings 28 carried by "spider" supports 30 mounted in the casing 16. The term "spider support" is used herein to mean a support having openings through which fluid in the casing 16 can flow. A tubular shroud 32 is mounted on a spider support 34 secured to the shaft 26 at a position spaced axially from the drive turbine 22. As a result, the shroud 32 is rotatable with the drive turbine 22 which is driven by fuel flow through the casing 16 by virtue of the inclination of the driving surfaces of the vanes 24.

A reaction turbine 36 is rotatably mounted on the shaft 26 so that it is rotatable relative thereto. A spiral spring 38 is attached at its inner end to the shaft 26 and at its outer end the spring 38 is attached to a pin 40 secured to the reaction turbine 36. As a result, when the drive turbine 22 is rotated, the spring 38 will provide for a similar rotation of the reaction turbine 36 at the same speed as the drive turbine 22 but at an angle lagging the drive turbine 22, hereinafter referred to as the "lag angle."

The magnitude of the lag angle is related to the speed of the fluid stream in the casing 16 and the mass of the fluid in the stream. In other words, as the speed of the stream is increased, the lag angle will increase due to the angular momentum of the drive turbine, and as the mass of the fluid is increased, the lag angle will also increase because of the increased force on the spring 38 necessary to drag the reaction turbine 36 behind the drive turbine 22. It can be mathematically shown, however, that the mass flow rate at a given time is proportional to the time lag between the drive turbine 22 and the reaction turbine 36. In other words, consider two points on the peripheries of the turbines 22 and 36 which are axially aligned when the turbines are at rest. When there is significant fluid flow through the casing 16, the point on the reaction turbine will angularly lag the point on the drive turbine. Next consider a fixed point on the casing 16. During rotation of the turbine, a given time lapse will take place between the time the point on the drive turbine 22 passes the fixed point on the casing 16 and the time the point on the reaction turbine 36 passes the same point on the casing 16.

This time lapse is referred to herein as $t_B$. Assume that there is no initial angular velocity in the fluid that enters the reaction turbine, and the fluid rotates with the turbine as a rigid body, and viscosity and end effects are neglected. The principle of Moment of Momentum in fluid mechanics states that relative to any fixed axis, the resultant moment of the external forces that act on the fluid in any given region equals the net rate at which moment of momentum is convected out of the region plus the time rate of increase of moment of momentum of fluid in the region (i.e. total time rate of change of angular momentum). Since the angular moment is given by $I\omega$ the torque required to drive the reaction turbine is:

$$T = \frac{d(I\omega)}{dt} \quad (1)$$

$$T = I\frac{d\omega}{dt} + \omega\frac{dI}{dt} \quad (2)$$

Where:
$T$ = reaction torque = resultant moments of the external force
$I$ = moment of inertia of fluid entering reaction turbine
$\omega$ = angular velocity Any torque on the reaction turbine is counterbalanced by the spring force, and can be written as:

$$T = K_s\Theta \quad (3)$$

Where:
$K_s$ = spring constant
$\Theta$ = angle between the drive and reaction turbines For a system which rotates with a constant angular velocity during one revolution, the angle '$\Theta$' can also be written as $$\Theta = \omega t_b \quad (4)$$

Combining (3) and (4)

$$T = K_s\omega t_B \quad (5)$$

Equations (2) and (5) can now be combined to obtain:

$$K_s\omega t_B = I\frac{d\omega}{dt} + \omega\frac{dI}{dt} \quad (6)$$

It is assumed that the angular velocity ($\omega$) of the turbine (and, therefore, the fluid) remains constant over this period, hence:

$$\frac{d\omega}{dt} = 0 \quad (7)$$

and Equation (6) becomes $$K_s t_b = \frac{dI}{dt} \qquad (8)$$

The moment of inertial of a disc of width 'h' can be presented as:

$$I = \frac{\pi R^4}{2} h p \qquad (9)$$

where:
R = radius of the disc
P = density of the disc
The mass of the disc is $$m = \pi R^2 h p \qquad (10)$$

combining (9) and (10) and letting $K_1 = R^2/2$, the moment of inertia of the disc is $$I = K_1 m \qquad (11)$$

(Note: $k_1$ is equal to a different constant for a disc with a hole in the center) and, for a sufficiently thin disc $$\frac{dI}{dt} = K_1 \frac{dm}{dt} \qquad (13)$$

Equations (8) and (13) are combined to provide $$t_B = \frac{K_1}{K_s} \frac{dm}{dt} \qquad (14)$$

which indicates that a rotating system as described above measures ($dm/dt$) independent of its nominal angular velocity.

It can thus be seen that a measurement of time $t_B$ will continuously provide a measure of mass flow rate irrespective of the speed of rotation of the drive turbine 22.

In the illustrated embodiment of the invention, the time $t_B$ is continuously measured by an optical unit 42 mounted on the casing 16 and electrically connected to a pickup circuit, indicated generally at 44, which transposes the time measurement into a reading on the gauge 14. The unit 42 includes a housing 46 secured to the casing 16 at a position in radial alignment with a hermetically pressure sealed window 48 provided in an opening 50 in the casing 16. The opening 50 is radially alignable with a slot 52 in the shroud 32 and is radially aligned with reflective strips 54 formed on the exterior surface of the reaction turbine 36. As best appears in FIG. 5, the reflective strips 54 are arranged in an alternating relation with nonreflecting strips 56 and are aligned with a reflecting strip 58 and a nonreflecting strip 60 arranged side-by-side on the exterior surface of the shroud 32. A light source 62 in the housing 46 operates to continuously direct a light beam through the window 48 into the casing 16. When the slot 52 in the shroud 32 is aligned with the light source 62, light will be reflected off the surfaces 54 and will fall on a pair of photocells 64. As the reaction turbine drag angle increases, the length of the optical strips which can be seen by the photocells 64 through the slot 52 in the shroud 32 increases. The cells 64 thus produce a pulse with a duration proportional to the drag angle times the speed or rotation, and thus to the mass flow rate.

The operation of the optical unit 42 can best be understood by considering the case of one pair of axially aligned strips 54 and 56 being visible through the slot 52, for example, the strips 54 and 56 shown in FIG. 5 as being aligned with the reflecting strip 58 on the shroud 32. Light from the source 62 is reflected from the strip 54 onto one of the photocells 64. Assume that at zero flow rate, none of the nonreflecting strip 56 is visible through the slot 52, at 20 percent flow rate, approximately 20 percent of the strip 56 is visible through the slot 52, as shown in FIG. 5, and at 100 percent flow rate the entire length of the slot 52 is taken up by the nonreflective surface 56. The arrangement of the light source 62 and the photocell 64 is such that an output pulse is produced during the time of passage of the nonreflective strip 56 visible through the slot 52 to the cell 64 during each revolution of the reaction turbine 22. The duration of the output pulse is thus related directly to the drag angle of the reaction turbine and inversely to the speed of rotation. The same principle of operation can be applied by interchanging the reflective and nonreflective surfaces 54 and 56 so that the duration of the pulse is proportional to the length of the reflective surface 54 visible through the slot 52.

In the illustrated system 42, an interchanged double row of strips utilizing two photocells 64 is illustrated. The advantage of the double system is that the output signals from the photocells 64 can be utilized in a bridge circuit in such a way as to compensate for several analog variations in the system such as changes in light levels, changes in reflectivity of reflective surfaces and variations in photocell sensitivity with temperature. Thus, in the illustrated embodiment of the invention, the pulse from the unit 42 is the input signal for an input gate 45 in the circuit 44. This pulse triggers the gate 45 which controls the output of a time-reference oscillator 47 allowing it to feed pulses to an electronic counter 49 while the input gate 45 is open. Each pulse from the oscillator 47 is counted and stored in the counter 49. The input gate 45 is turned off by the trailing edge of the input pulse. Thus, the count stored in the counter 49 at the end of the pulse represents the time lag of the reaction turbine relative to the drive turbine. An output gate 51 gates the information stored in the counter 49 directly into the counter gauge 14. This establishes the counter number which displays mass flow rate directly in pounds or kilograms per hour.

The flowmeter 10 is shown in greater detail in FIGS. 2—4, inclusive, which show the drive turbine 22 as being mounted adjacent a nozzle block 66 having slots 68 through which fluid from the inlet 18 is directed against the vanes 24 in the turbine 22 so as to promote rotation of the turbine 22 in response to fluid flow. Radially inwardly of the vanes 24, the turbine 22 includes a flat plate portion 70 provided with a series of openings 72, hereinafter referred to as bypass openings since fluid from the inlet 18 can flow through the openings 72 so as to bypass the vanes 24. A valve plate 74 is positioned adjacent the turbine portion 70 is connected by a hollow shaft 76 to the reaction turbine 36. Bearings 78 support the shaft 76, and thus the reaction turbine 36 and the valve plate 74, on the drive turbine shaft 26. At low flow rates, the valve plate 74 covers the bypass openings 72. As the flow rate increases, so that the lag angle increases, openings 80, only one of which is shown, in the valve plate 74 are progressively aligned with the bypass openings 72 so as to progressively uncover the openings 72 and provide for increased flow of fluid therethrough. Thus, as the rate of flow of fluid through the casing 16 is increased, the bypass openings 72 are progressively uncovered to thereby progressively increase the amount of flow therethrough. Contouring the valve bypass opening 72 can provide and is wide variety of turbine speed-flow rate curves for operation of the flowmeter 10 at various flow ranges. This eliminates any problems that might be caused due to wide variations in the speed of rotation of the drive turbine 22.

Fluid flowing from the inlet 18 past drive turbine 22, either between the vanes 24 or through the bypass openings 72, flows around an inner shell 82 in the casing 16 so that it is directed through the reaction turbine 36. As shown in FIGS. 2 and 4, the reaction turbine 36 has a plurality of vanes 84, which are parallel to the shaft 26 and are of a radial width equal to the distance between the casing 16 and the shell 82, so that all of the fluid from the drive turbine 22 must flow between the vanes 84. These vanes 84 are arranged radially within the shroud 32 which is disposed in a closely spaced relation with the casing 16 so as to preclude flow of fluid around the reaction turbine 36. The flow of all of this fluid through the reaction turbine 36 insures the desired effect of all of the fluid in the stream flowing through the casing 16 on the reaction turbine 36. Fluid leaving the reaction turbine 36 flows out of the flowmeter 10 through the discharge end 20 of the casing 16.

In the operation of the flowmeter 10 assume that the mass flow rate of fluid through the casing 16 is very small so that the lag angle is small. Under this condition, the drive turbine bypass openings 72 are closed. As the mass flow rate is increased, the torque required to rotate the reaction turbine 36 is increased, so that the lag angle is increased thereby resulting in movement of the valve plate 74 to a position in which the bypass openings 72 are at least partially uncovered so that fluid can flow therethrough and through the openings 80 in the valve plate 74. This reduces the amount of fluid flow on the vanes 24 of the drive turbine 22 to thereby prevent an undue increase in the speed of rotation of the drive turbine 22.

During rotation of the shroud 32 and the reaction turbine 36, the optical unit 42 will continuously provide a time measurement pulse indicative of the lag angle. This pulse is converted by the circuit 44 into a reading on the guage 14 of mass flow rate.

A modified form of the flowmeter of this invention, indicated generally at 10a, is shown in FIGS. 6—8. The flowmeter 10a includes a generally tubular casing 100 having an inlet end 102 and an outlet end 104. Fluid entering the casing 100 through the inlet end 102 first passes through straightening vanes 106 which remove any swirl or initial angular velocity. From the straightening vanes 106 the fluid passes through a shrouded reaction turbine 108 which is rotating at some speed. The reaction turbine 108 has straight vanes 110 of sufficient length to insure that all of the fluid entering the turbine is accelerated to the angular velocity of the turbine before flowing off the turbine. This insures that the torque required to accelerate the fluid is an exact function of the mass flow rate.

The flowmeter 10a also includes a drive turbine 112 which is of "orifice-type" rather than "blade-type." In other words, the drive turbine 112 is provided with angularly directed orifices or passages 114 (FIGS. 7 and 8) inclined such that in response to a flow of fluid therethrough, the drive turbine 112 is rotated. The walls of the orifices 114 and the adjacent areas of the turbine 112 thus form driving surfaces inclined relative to the direction of fluid flow in casing 100 so that in response to flow the turbine 112 is rotated. Thus, the orifice-type drive turbine 112 is utilized in the flowmeter 10a to provide torque at low flow rates. At high flow rates, only a small portion of the fluid flow is required to drive the turbine and the remaining portion of the fluid flows through a variable orifice bypass valve assembly 116 located in the center of the drive turbine 112.

The bypass valve assembly 116 consists of circumferentially extending slots 118 in an annular flange 119 formed on the drive turbine 112 at a position radially inwardly of the orifices 114 and radially aligned slots 120 formed in a concentric valve flange 122 secured to the reaction turbine 108. At zero flow rate, the bypass valve assembly 116 is closed because the slots 118 and 120 are out of alignment, thereby precluding flow radially inwardly through the slots 118 and 120. As the flow increases, the slots 118 and 120 become increasingly aligned so as to progressively increase the flow through the bypass valve assembly 116 and through openings 123 in the drive turbine 112 to the housing outlet 104. This progressive increase in the alignment of the slots 118 and 120 is due to the connection of the drive turbine shaft 124 and the reaction turbine 108 by a spiral spring 126 similar to the spring 38 in the flowmeter 10. As the flow rate increases, so that the speed of rotation of the drive turbine 112 is increased, the reaction turbine 108 is rotated at the same speed but the angle by which the reaction turbine 108 lags the drive turbine 112 is progressively increased due to the spring 126. In the flowmeter 10, potential errors caused by viscous drag of the fluid between the reaction turbine 108 and the housing 100 are eliminated by the use of a tubular shroud 128 positioned around the reaction turbine 108 and secured to the drive turbine 112. An optical pickoff unit, like the unit 42 heretofore described in connection with flowmeter 10, can be mounted on the housing 100 so as to provide a continuously recurring time measurement of the lag angle.

It can thus be seen that the flowmeter 10a incorporates the same variable flow bypass arrangement incorporated in the flowmeter 10 to enable accurate operation over substantial flow ranges. The flowmeter 10a differs from the flowmeter 10 in that the direction of the fluid flow is reversed since it flows first through the reaction turbine 108 and then the drive turbine 112. The straightening vanes 106 are located in the casing 100 adjacent the inlet 102 instead of between the reaction turbine and the drive turbine as in the flowmeter 10. This enables a simpler construction. The purpose of the orifice-type drive turbine 112 is to enable operation of the turbine at a higher pressure drop and lower cross-sectional area than is the case with a bladed-type turbine. The concentric flanges 120 and 122 in the variable orifice bypass valve 116 are the functional equivalent of the adjacent relatively rotatable plates 70 and 74 in the corresponding bypass valve in the flowmeter 10.

From the above description it is seen that this invention provides flowmeters which, by virtue of the inclusion therein of the optical unit 42, provide a continuously recurring time base measurement of mass flow rate. By virtue of the inclusion of the bypass openings in the drive turbine in each case, and the control of these openings by a valve member attached to the reaction turbine, drive turbine speeds are controlled within limits such that the flowmeters 10 and 10a are accurate over a wide flow range.

I claim:

1. In a mass flowmeter for measuring the mass rate of flow of a fluid stream, a casing forming a passage for said stream, a drive turbine rotatably mounted in said casing, said turbine having driving surfaces arranged at an angle to the direction of flow of said stream in said casing so that in response to flow of fluid in said casing said drive turbine is rotated, said drive turbine being formed with at least one bypass opening, a reaction turbine rotatably mounted in said casing at a position spaced from said drive turbine, yieldable means extending between said drive turbine and said reaction turbine providing for rotation of said reaction turbine in response to rotation of said drive turbine so that said reaction turbine lags said drive turbine by a lag angle which is proportional in magnitude to the speed of rotation of said drive turbine and the mass flow of said stream, and means carried by one of said turbines and disposed adjacent said bypass opening for progressively uncovering said opening in response to increase in said lag angle.

2. A mass flowmeter according to claim 1 wherein said means carried by one of said turbines is a valve member disposed in a covering relation with said bypass opening.

3. A mass flowmeter according to claim 2 wherein said turbines are coaxially arranged and are provided with concentric tubular members one of which is formed with said bypass opening and the other one of which constitutes said valve member.

4. A mass flowmeter according to claim 2 wherein said turbines are coaxially arranged and are provided with axially adjacent plate members one of which constitutes said valve member and the other one of which is formed with said bypass opening.

5. A mass flowmeter according to claim 1 further including means mounted on said casing operative to provide a time measure of said lag angle and the speed of rotation of said turbines.

6. A mass flowmeter according to claim 5 wherein said means mounted on said casing includes a light source, a reflective surface on said reaction turbine, and photocell means located to receive light from said source reflected off said reflected surface.

7. In a mass flowmeter for measuring the mass rate of flow of a fluid stream, a casing forming a passage for said stream, a drive turbine rotatably mounted in said casing for rotation by said stream, said drive turbine having at least one bypass opening, a tubular member in said casing attached to said drive turbine for rotation therewith, a reaction turbine rotatably mounted in said casing at a position spaced from said drive turbine and within said tubular member, yieldable means connected to and extending between said drive turbine and said reaction turbine providing for rotation of said reaction turbine by said drive turbine so that said reaction turbine lags said tubular member by a lag angle which is proportional in magnitude to the speed of rotation of said drive turbine and the mass flow rate of said stream and means carried by one of said turbines and disposed adjacent said bypass opening for progressively uncovering said opening in response to increase in said lag angle, and means mounted on said casing and operatively connected to said tubular member and said reaction turbine for providing a continuously recurring time measure of said lag angle and the speed of rotation of said turbines.

8. A mass flowmeter according to claim 7 wherein said means for providing a measure of said lag angle includes a housing mounted on said casing at a position in substantial radial alignment with said tubular member and said reaction turbine, window means in said casing communicating with said housing, means forming a slot in said tubular member in substantial radial alignment with said window means, a source of light in said housing operable to direct light through said window means, a reflective surface on said reaction turbine located to reflect light from said source, and photocell means operatively associated with said light source and said reflective surface so as to provide a continuous signal indicative of the magnitude of said lag angle and said speed of rotation.

9. A mass flowmeter for measuring the mass rate of flow of a fluid stream comprising a casing forming a passage for said stream, a drive turbine rotatably mounted in said casing, said turbine having driving surfaces arranged at an angle to the direction of flow of said stream in said casing so that in response to flow of fluid in said casing said drive turbine is rotated, said turbine having a shaft attached thereto and having at least one bypass opening located in said turbine, said turbine being arranged in said casing so that said stream must flow past said driving surfaces or through said opening in order to pass said turbine, a reaction turbine rotatably mounted on said shaft, yieldable means connected to and extending between said shaft and said reaction turbine providing for rotation of said reaction turbine with said drive turbine so that said reaction turbine lags said drive turbine by a lag angle which is proportional in magnitude to the speed of rotation of said drive turbine and the mass flow rate of said stream, and a valve member attached to said reaction turbine and disposed adjacent said bypass opening so as to cover said opening when said lag angle is below a predetermined angle and progressively uncover said opening as said lag angle is increased above said predetermined angle.

10. A mass flowmeter according to claim 9 further including means on said casing for providing a continuous measurement of said lag angle.

11. A mass flowmeter according to claim 10 wherein said measuring means includes a light source and photocell means operable to detect light reflected from said source and provide a pulse of a duration proportional to the lag angle and the speed of rotation of said turbines.

12. A mass flowmeter according to claim 11 further including a tubular member mounted on said shaft for rotation therewith, means forming an opening in said tubular member located so that light from said source is directed therethrough, and a light reflective surface on said reaction turbine located to receive light traveling through said opening.